United States Patent [19]

Marshall, Jr.

[11] Patent Number: 5,106,420

[45] Date of Patent: * Apr. 21, 1992

[54] MINERAL BASED COLORING PIGMENTS

[75] Inventor: Carl J. Marshall, Jr., Macon, Ga.

[73] Assignee: J. M. Huber Corporation, Rumson, N.J.

[ * ] Notice: The portion of the term of this patent subsequent to Apr. 21, 2009 has been disclaimed.

[21] Appl. No.: 427,342

[22] Filed: Oct. 27, 1989

[51] Int. Cl.⁵ .................. C08K 5/00; C04B 14/10; C09C 1/02

[52] U.S. Cl. .................. 106/499; 106/417; 106/468; 106/483; 106/487

[58] Field of Search .............. 106/417, 468, 483, 487, 106/499

[56] References Cited

U.S. PATENT DOCUMENTS

| | | | |
|---|---|---|---|
| 3,545,909 | 12/1970 | Gagliardi | 8/523 |
| 3,834,924 | 9/1974 | Grillo | 106/490 |
| 3,950,180 | 4/1976 | Kato | 106/468 |
| 4,084,983 | 4/1978 | Bernhard et al. | 106/417 |
| 4,444,592 | 4/1984 | Ludwig | 106/23 |
| 4,543,128 | 9/1985 | Troesch et al. | 106/214 |
| 4,566,909 | 1/1986 | Nakatani et al. | 127/33 |
| 4,609,404 | 9/1986 | Marraccini et al. | 106/417 |
| 4,655,843 | 4/1987 | Marraccini et al. | 106/483 |
| 4,773,936 | 9/1988 | Clark et al. | 106/499 |

OTHER PUBLICATIONS

Juzu et al., "Coloring of Inorganic Material", Dec. 19, 1975 (Chemical Abstract 84:181745z.

Primary Examiner—William R. Dixon, Jr.
Assistant Examiner—Helene Klemanski
Attorney, Agent, or Firm—Harold H. Flanders; Alec H. Horn; Robert L. Price

[57] ABSTRACT

A mineral based coloring pigment has been developed which includes a water-soluble organic dye which has been insolubilized or "fixed" onto a mineral pigment substrate by means of a cationic or anionic chemical compound. Also, a method for producing the mineral based coloring pigment and products containing the mineral based coloring pigment have been developed.

21 Claims, 1 Drawing Sheet

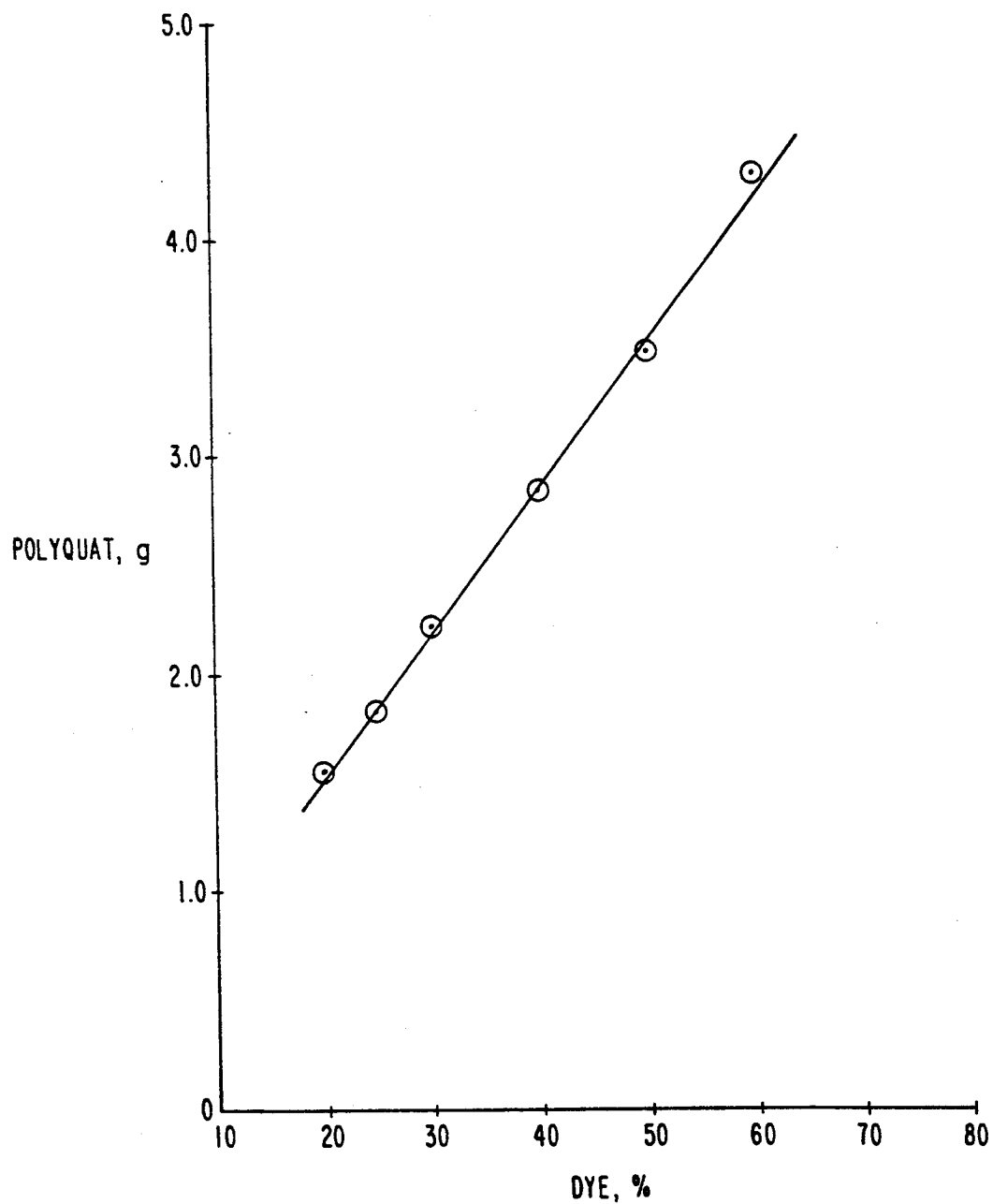

MINERAL BASED COLORING PIGMENTS

TECHNICAL FIELD

This invention relates to water-soluble organic dyes which have been insolubilized or "fixed" onto various mineral pigment substrates to thereby form mineral based coloring pigments. The mineral based coloring pigments are designed to replace presently used inorganic or organic pigments in many different applications including plastics, rubber, paint, printing inks, and paper.

BACKGROUND ART

Historically inorganic pigments, such as hydrated or anhydrous siliceous minerals including metal silicates, sodium alumino silicates, hydrated aluminum silicates, e.g., clays, have found increasing uses in many industries. For example, such pigments are employed in paper coating compositions, as fillers for paper, paints, inks, etc., and as reinforcing pigments or fillers in elastomers and other polymeric materials. In addition to being used as fillers, inorganic pigments are often used as color-imparting fillers in papers, paints, inks, etc. and as reinforcing pigments or fillers in elastomers and other polymeric materials.

In the process of dying pigments, it is important to insolubilize or otherwise fix dyes onto the pigment particles. In this regard, it is often necessary to treat pigment particles in such a manner so as to improve the affinity of the pigment particles to the dyestuffs utilized.

Several methods of improving the affinity of various pigment particles to dyestuffs have been reported. U.S. Pat. No. 3,834,924 to Grillo teaches a process for manufacturing surface modified inorganic pigments. The process according to this patent includes adding amino organosilanes to an aqueous dispersion of an inorganic pigment whereby the inorganic pigment is contacted with the amino organo silane and reacts so that the surface of the inorganic pigment is modified in such a manner to increase the affinity for dyes.

U.S. Pat. No. 3,545,909 to Gagliardi teaches aminoalkyl silicone coloring assistances that may be applied in the form of a pre-treatment to condition inorganic pigment substrates for a subsequent coloring operation. This pre-treatment with the aminoalkyl silicone coloring assistance induces dyeable sites onto normally non-affinitive materials so that they may accept conventional anionic type organic dyes.

U.S. Pat. No. 4,084,983 to Bernhard et al teaches a process for producing colored lustrous pigments in which a firmly adhering coating of aluminum hydroxide is first applied to pigment substrates. The aluminum ions contained in the coating are then reacted in order to form a firmly adhering dyestuff layer. In this manner, the substrate is coated with a starting material which is convertible into a colored layer.

U.S. Pat. No. 4,543,128 to Troesche et al teaches a process for dying inorganic pigments that can be used as fillers. According to this patent, pigments are dyed with polycationic dyestuffs in a process that involves providing a colored composition of an aqueous paste for dispersion of the white pigment with a water-soluble polycationic dye. An optional, conventional, fixing agent may be used in this process.

U.S. Pat. No. 4,566,908 to Nakatani et al teaches a process for producing an azoic pigment including a silica core with a coating of amino or polyazoic dye chemically bound to the surface of the silica core through an amino silane coupling agent.

While previous efforts had focused on various methods to fix diverse dyestuffs onto selective substrates, there is a long-felt need for developing methods whereby safer organic dyes could replace currently used inorganic pigments, many of which are based upon heavy metals and pose potential health problems both in their processing and use. In this regard, solvent dyes have been developed to overcome associated health concerns in many rubber and plastics applications. However, solvent dyes are usually expensive, may involve volatile and/or toxic solvent vehicles during use, are often hard to disperse, may migrate and rub off, and sometimes degrade the rubber and plastic materials into which they are incorporated.

Water-soluble, organic dyes have the potential of addressing the problems of both inorganic pigments and solvent dyes in many applications. Nevertheless, methods for stabilizing water-soluble, organic dyes, particularly dyes that can be used to replace currently used heavy metal-based pigments are lacking. The present invention provides a method for coloring inorganic pigments substrates which is an improvement over prior known methods. The water-soluble, inorganic dyes are thereby rendered functional in a variety of media and circumstances of use where advantage could not otherwise be taken of their desirable features.

DISCLOSURE OF THE INVENTION

It is one object of the present invention to provide a method for insolubilizing or fixing water-soluble organic dyes onto various pigment substrates by means of cationic or anionic chemical compounds.

It is a further object of the present invention to provide mineral based coloring pigments that are designed to replace presently used inorganic or organic pigments in many different applications including plastics, rubber, paint, printing inks and paper.

A still further object of the present invention is to provide mineral based coloring pigments which can be used to replace currently used heavy metal inorganic pigments, thereby avoiding health problems associated with said pigment materials.

A still further object of the present invention is to provide mineral based coloring pigments that can be utilized as reinforcing pigments to replace many conventional dyes and pigments which have been found to be deleterious to the physical properties of materials such as rubbers and plastics.

A still further object of the present invention is to provide for mineral based coloring pigments which have better handling and clean-up properties than previously devised organic or inorganic pigments and organic dyes.

An even further object of the present invention is to provide for mineral based coloring pigments that function as dye extenders so that less actual dye is required for proper coloration.

Other objects and advantages of the present invention will become apparent as the description proceeds.

According to the invention, there is provided a coloring pigment useful for coloring or tinting inks, paints, plastics and rubber, which pigment comprises a mineral based coloring pigment wherein a water-soluble organic dye has been insolubilized or fixed on to a mineral pigment substrate by means of a cationic or anionic chemical compound.

The present invention also provides a method for preparation of mineral based coloring pigments useful for coloring or tinting inks, paints, plastics and rubber which involves reacting a water-soluble organic dye in the presence of a mineral pigment with a cationic or anionic chemical fixative, the reaction being carried out in the slurry form in which the cationic or anionic chemical fixative is titrated to an identifiable end point. After formation, the resulting mineral based coloring pigment is recovered from the dye-mineral slurry by a filtering process.

Also provided by the present invention are colored or tinted printing inks, paints, plastics and rubber compositions containing color pigments which comprise water-soluble organic dyes which are insolubilized or fixed onto various mineral pigment substrates by means of cationic or anionic chemical compounds.

BRIEF DESCRIPTION OF DRAWINGS

Reference is now made to the drawing accompanying the application which is a graph showing the relationship between the reaction compounds.

BEST MODE FOR CARRYING OUT THE INVENTION

The present invention relates to a mineral based coloring pigment which is useful for coloring or tinting various materials including inks, paints, plastics and rubber. This mineral based coloring pigment is the reaction product of a water-soluble organic dye and a mineral pigment which have been mixed together and titrated with a cationic or anionic chemical fixative to an identifiable end point at which the water-soluble organic dye is insolubilized or fixed onto the mineral pigment substrate. The mineral based coloring pigments produced by this reaction are characterized by unique physical and chemical characteristics.

Mineral based coloring pigments produced in accordance with the present invention provide reinforcing characteristics which enhance the physical properties of materials in which they are incorporated, such as elastomers, rubber and plastics. This enhancement of physical characteristics is an improvement over many previous organic pigments and dyes which were found to be deleterious to the physical properties of materials such as rubber and plastics.

These mineral based coloring pigments also demonstrate better handling and cleanup properties than most organic and inorganic pigments and dyes thereby enabling lower production cost and thus affording the mineral based coloring pigments of the present invention economical and commercial advantages over previous organic and inorganic pigments and dyes.

It has been found that the mineral based coloring pigments of the present invention act as dye extenders whereby less actual dye is required for equal coloration. In this regard, the mineral based coloring pigments have superior coloring strength over previous organic dyes.

Finally, the mineral based coloring pigments of the present invention have been found to be superior replacements for inorganic pigments which currently incorporate heavy metals which have been determined to pose substantial health problems both in processing and in final product use.

The mineral based coloring pigments according to the present invention can be used in any application wherein coloring or tinting of a finished material is desired. Inks, paints, plastics and rubber are examples of major systems in which the new mineral based coloring pigments can be used. The pigments are particularly useful for incorporation into polyolefins such as polypropylene.

Any of several reaction routes can be utilized to produce the present mineral based coloring pigments. For example, water-soluble organic dyes can be combined with the mineral substrate materials and subsequently insolubilized or fixed onto the substrate materials by reacting the dye-mineral substrate mixture with appropriate cationic or anionic chemical compounds. In other instances, the water-soluble organic dye can be dissolved in water into which the mineral pigment substrates are subsequently added in a dry or slurry form. The cationic or anionic chemical fixative is then titrated into the dye-mineral pigment mixture to an identifiable end point so as to unsolubilize or fix the dye onto the mineral pigment, thereby forming the mineral based coloring pigments of the present invention.

The preferred procedure for preparation of the mineral based coloring pigments of the present invention is to add the selected dye to heated water preferably in the range of 50-70° C . The water is preferably demineralized water, although tap water can also be used. Heating the water to an elevated temperature is preferred in order to dissolve the dye, but certain dyes are also soluble in cold water so that use of the heated water is an optional feature depending on the dye used. After the dye is added to the water, mixing is carried out preferably with low shear until the dye is dissolved, which usually occurs within a period of no more than about 5 minutes. Thereafter, the mineral pigment is added to the water with good mixing.

While kaolin clay represents the preferred mineral substrate, other minerals which can be used include calcined kaolin, synthetic alkali metal silicates such as those described in U. S. Pat. No. 4,812,299, alumina trihydrate, mica and mixtures thereof. Kaolin is the preferred substrate, however, as it produces a considerably more intense dye/mineral pigment than the other minerals investigated to this point. A combination of fine particle size (less than 1 micron average particle diameter) and dye/quaternary alignment on the platelets (no porous surface) is believed to explain why kaolin is a better substrate than the other minerals.

After the mineral substrate is added to the dye/water solution, the selected cationic or anionic chemical compound is added slowly with mixing. At this stage it is preferred that the pH of the slurry be in the range of 4.0 to 5.0, and the pH may be adjusted by addition of acid or acid salt, but preferably acetic acid.

After the cationic or anionic chemical compound is added, the resulting slurry is then mixed for an additional period of about 1 to 10 minutes using low shear mixing. Thereafter the resulting mixture is filtered and washed with water until all salts are removed. Preferably it is desirable to obtain a filtrate resistance reading of 125,000 ohms or higher at this point. The filter cake is then allowed to form and is then dried. Drying is preferably carried out in an oven for example at 60-110° C. for 1-3 hours. Drying should be conducted under controlled low temperature conditions to prevent the material from drying to excessive hardness.

The resulting dried solid is then milled to the required fineness for each application, preferably 3 microns or finer.

It is preferred that the cationic or anionic chemical compound or fixative be a water-soluble polyquaternary ammonium salt polymer which has a molecular weight ranging from 100 to 1 million. For some dye systems, a polyquat polymer having a molecular weight range of 1000-3000 is preferred. For other systems, a polyquat polymer of molecular weight 10,000 to 100,000 or an average of about 50,000, was preferred. The degree of water solubility of the dye selected has a substantial bearing on the molecular weight range of the polyquat polymer required for fixation. For dyes having a high degree of water solubility, high molecular weight polyquats were required for fixation on the mineral.

During the reaction various other additives may be used as desired for best results. For example, organic dispersants can be added to speed up the filtration rate and reduce hardness of the resulting dye/mineral pigment.

Water-soluble organic dyes found to be useful for purposes of the present invention include acid, direct and reactive dyes having acid functionality, such as dyes having sulfonic and/or carboxylic groups associated therewith. In the system, cationic fixatives are used for acid dyes and anionic fixatives are used for basic dyes. In addition, cationic or basic dyes have been found to be useful for the purposes of the present invention, particularly those having quaternary nitrogen functionality, although these dyes may sometimes contain positively charged sulfur or oxygen functionality as well. In all, as exemplified by the examples set forth hereinbelow, the present invention has been found to be applicable for insolubilizing or fixing all types of water-soluble dyes. Additionally, it has been discovered that the present invention is useful in fixing multiple dye systems in which two or more dyes are combined to produce diverse colored mineral based coloring pigments.

As illustrated in the examples which follow, cationic fixatives were found to be particularly useful in insolubilizing or fixing acid and direct water-soluble dyes. Particular cationic fixatives found useful for purposes of the present invention include resinous polymers, methylolamide polymers, and quaternary ammonium polymers. The quaternary ammonium polymers include both mono-, di- and polyquaternary ammonium polymers. Inorganic polymers such as zirconium oxychloride may also be used, especially for high temperature applications. Examples of polyquaternary ammonium polymers include polyamide polymers and polyamine polymers The fixative must be water soluble or emulsifiable and the pH should be between 3.0 and 9.0.

Anionic chemical fixatives were found to be particularly useful in insolubilizing or fixing basic type water-soluble dyes. Exemplary anionic fixatives include resorcinol formaldehyde, a partial ester of styrene maleic anhydride, a monoammonium salt of a styrene maleic anhydride and polyacrylates.

The dyes to be used in the present invention include any dyes which are operable. In general, known red dyes, yellow dyes, blue dyes and black dyes appear to be operable. The preferred red dyes include Sol-Aqua-Fast Red 2BL, Direct-Fast-Scarlet 4BSW, Intracon Brilliant Red 4G-E, Stylacyl Red RY, and Stylacyl Red RB. The preferred yellow dyes include Intralan Brilliant Yellow 3GL, Intracron Brilliant Yellow 6G-E, Intracron Brilliant Yellow G-E, Nylanthrene Brilliant Yellow 4NGL, and Stylacyl Yellow RG. The preferred blue dyes include Intralite Turquoise Blue GRLL, Nylanthrene Blue LGGL, Intralite Blue 3GLST. The preferred black dye is Intralan Grey BL-SCRC. In general, however, any dye which provides the desired color and which can be fixed onto the mineral substrate according to the invention is considered to be within the scope of the invention.

As pointed out above, the products of the present invention are produced by adding a predetermined quantity of the selected water-soluble dye to a sufficient amount of water to dissolve the water-soluble dye and form a dye solution. The mineral pigment is then added to the dye solution to form a dye/mineral mixture. The chemical fixative is then titrated into the dye/mineral mixture to an identifiable end point so that the water-soluble organic dye is fixed onto the mineral pigment. It is necessary that the reactants be added in this order in order for the dye to become fixed to the mineral substrate. As the dye goes from its soluble form to an insoluble form, it deposits on the clay via the chemical fixative.

In conducting this reaction it is preferred that the solution should contain from between about 0.05 and 10 wt%, preferably 1.0 to 2.0 wt% of the water-soluble organic dye. The titration of the chemical fixative proceeds to an end point which is determined by spot testing the dye/mineral on filter paper until no dye is found to bleed from the dye/mineral mixture.

Suitable mineral substrates determined to be useful for purposes of the present invention include hydrous clays, calcined clays, synthetic alkali metal alumino-silicates (SAMS), micas and alumina trihydrate (ATH). Preferred hydrous and calcined clays include kaolins and hectorites. Preferred materials are synthetic alkali metal alumino-silicates including those prepared from a Hydragloss ® clay, those prepared from an Omnifil ® clay those prepared from a Hydraprint ® clay, and those prepared from a Hydrafine ® clay. All of these clays are commercially produced products of J. M. Huber Corporation.

In accordance with the present invention it has been determined that acid, basic, direct and reactive dyes can all be successfully insolubilized or fixed onto various mineral substrates.

The ionic chemical fixatives found useful for purposes of the present invention include both cationic and anionic compounds. In particular cationic and anionic polymers are used to fix several dyes onto a variety of mineral substrates.

Particular cationic fixatives are quaternary ammonium compounds, including mono-, di- and polyquaternary ammonium compounds. Exemplary polyquaternary ammonium compounds include polyamide polymers and polyamine polymers. Other exemplary cationic fixatives include resinous polymers and methylolamide polymers.

Particular anionic fixatives found to be useful for purposes of the present invention include resorcinol formaldehyde, a partial ester of styrene maleic anhydride, a monoammonium salt of styrene maleic anhydride and polyacrylates.

The process for producing the mineral based coloring pigments, as discussed in detail above, involves reacting a mineral pigment with a water-soluble organic dye in the presence of an ionic chemical fixative whereby the water-soluble dye is fixed onto the mineral substrate by means of the ionic chemical fixative.

In a separate embodiment using a dry process, the process involves first dry mixing the mineral substrate and the water-soluble organic dye. The dye mixture is next dissolved in an aqueous solution which is subsequently dried to leave a dye/mineral composition. The dye/mineral composition is redissolved in an aqueous solution to which the ionic chemical fixative is added to produce the mineral based coloring pigment which is subsequently filtered, dried and milled to a fine powder.

In the drawing accompanying the present invention, there is set forth a graph which shows the relationship between one particular dye, the mineral substrate level, and the amount of low molecular weight fixative polymer required to insolubilize the dye. In this particular embodiment, the dye is Reactive Blue 209, the mineral substrate is kaolin and the fixative is a low molecular weight polyquat polymer. From the figure it will be noted that 1.6 grams of fixative would be required for 20 wt% of dye up to about 4.3 grams of fixative polymer for 60 wt% of dye.

The products resulting from the process of the present invention are mineral based coloring pigments which can be used in various areas for coloring materials such as paint, plastics, paper, printing inks, rubber, elastomers and the like. A preferred product is a polyolefin such as polypropylene which contains a coloring amount of the product of the invention. The amount of mineral based coloring pigment of this invention which should be added to the rubber, plastic, paint, printing ink, paper or the like should be in the range of about 0.001 up to about 1.0% based on the total polymer or total solids in the product. The mineral based coloring pigment of this invention is incorporated into the material using conventional methods.

The following examples are presented to illustrate the invention but it is not to be considered as limited thereto. In the examples and throughout the specification, parts are by weight unless otherwise indicated.

EXAMPLE 1

The following formulations were prepared in accordance with the method of the invention. The formulations were prepared by adding the dye to hot 50–70° C. demineralized water while mixing with low shear until the dye was dissolved, which usually occurred in less than 5 minutes. The mineral substrate, in this case kaolin clay, was then added as a slurry and mixed for five minutes. The kaolin clay was a white (90 GE brightness), fine particle size (96–100% minus 2 microns) material. The SAMS mineral is a synthetic alkali metal silicate which is a white agglomerated synthetic pigment with high oil absorption. This product is prepared in accordance with the processes described in U. S. Pat. No. 4,812,299. The polyquaternary ammonium salt polymer was then added to the dye mineral slurry slowly with mixing. The polyquaternary ammonium polymer was selected for acid functional dyes, with anionic polymers containing sulfonic or carboxylic acid groups for cationic dyes or water soluble polymers. Acids or acid salts could be used to adjust the pH of the slurry as necessary. After the polyquaternary ammonium salt polymer was added, the mixture was agitated under low shear for five minutes, filtered, washed with deionized water until the filtrate resistance reading of 125,000 ohms or higher was obtained. The filter cake was then dried in an oven at 60–110° C. for 1–3 hours and milled to a fine powder of 3 microns or finer. The following were the formulations employed.

| Formulations: |
|---|
| 500.0 g demineralized water at 50–65° C. |
| Xg dye (mix until dissolved) |
| Yg kaolin (may be added as slurry) |
| Zg polyquaternary ammonium salt polymer solution (polyquat) |
| a. 40% reactive red 124/60% kaolin |
| 500.0 g demineralized water |
| 4.0 g reactive red 124 dye |
| 6.0 g kaolin |
| 2.6 g polyquat (low MW) |
| b. 60% reactive yellow 111/40% kaolin |
| 500.0 g demineralized water |
| 6.0 g reactive yellow 111 dye |
| 4.0 g kaolin |
| 2.8 g polyquat (low MW) |
| c. 60% acid blue 283+/40% kaolin |
| 500.0 g demineralized water |
| 6.0 g acid blue 283 dye |
| 6.0 g kaolin |
| 3.5 g polyquat (low MW) |
| d. 50% direct red 80*/50% kaolin |
| 500.0 g demineralized water |
| 5.0 g direct red 80 dye |
| 5.0 g kaolin |
| 1.8 g diquat (very low MW) |
| e. 50% acid red 73*/50% kaolin |
| 600.0 g demineralized water |
| 5.0 g acid red 73 dye |
| 5.0 g kaolin |
| 4.3 g monoquat (very low MW) |
| f. 50% methyl violet* (basic violet 1)/50% SAMS |
| 600.0 g demineralized water |
| 6.0 g methyl violet dye |
| 5.0 g SAMS |
| 2.7 g styrene/maleic anhydride polymer |
| g. 25% methylene blue* (basic blue 9)/50% SAMS |
| 150.0 g demineralized water |
| 2.5 g methylene blue |
| 7.5 g SAMS |
| 2.1 g resorcinol-formaldehyde resin |
| h. 20% acid blue 283+/20% reactive yellow 111/60% kaolin (green dye on kaolin) |
| 600.0 g demineralized water |
| 2.0 g acid blue 283 |
| 2.0    reactive yellow 111 |
| 6.0 g kaolin |
| 2.6 g polyquat (low MW) |

*Dye used on "as is" basis; dye activity unknown.
+Dye assumed to be 50% active.

EXAMPLE 2

Using the preparation procedure of Example 1, a series of products were produced using the dyes set forth below in Tables 1, 2, 3 and 4. Table 1 are red dyes, Table 2 are yellow dyes, Table 3 are blue dyes, and Table 4 are black dyes. In the tables, it will be noted that the dye is identified, the fixation rate is indicated as G-Good or NG-No Good, the filtration rate is identified as F-Fast, M-Medium, or S-Slow, the color of the filtrate is indicated, C being clean and the indication of foaming as Y-Yes or N-No indicated. Inorganic fixation with filtrate and foaming is also indicated using the same abbreviations.

TABLE 1

| DYE | C.I. | ORGANIC FIXATION | FILTRATION RATE | FILTRATE | FOAM | INORGANIC FIXATION | FILTRATE | FOAM |
|---|---|---|---|---|---|---|---|---|
| Intracid Red 2G | A. 1 | NG | — | — | — | NG | Red-Orange | Y |
| Intralan Red 2G | A- | G | M-S | C | Y | G | C | Y |
| Nylanthrene Red B-2BSA | A. 266 | G | M-S | C | Y | G | C | Y |
| Stylacyl Red RB | A. 364 | G | S | C | Y | NG | Red | Y |
| Stylacyl Red RY | A. 384 | G | F | C | Y | G | C | Y |
| Direct Brilliant Pink B | D. 9 | G | F | C | Y | NG | Light Red | Y |
| Direct Scarlet 4SWN | D. 72 | G | F | Faint Orange | Y | NG | Light Orange | Y |
| Direct Scarlet 4BSW | D- | G | F | C | Y | G | Faint Brown | Y |
| Direct Scarlet SE | D- | G | S | V. Light Orange | N | NG | Orange | Y |
| Direct Red CAS | D. 236 | G | F | C | N | G | V. Light Peach | N |
| Sol-Aqua-Fast Red RL | D- | G | S | C | Y | NG | Peach | Y |
| Sol-Aqua-Fast Red 2BL | D. 80 | G | M-S | C | Y | G | C | Y |
| Sol-Aqua-Fast Red 3BL | D- | G | F | C | Y | G | V. Light Pink | Y |
| Intracron Brilliant Red 4G-E | R. 120 | G | S | V. Light Pink | N | NG | Red | N |

TABLE 2

| DYE | C.I. | ORGANIC FIXATION | FILTRATION RATE | FILTRATE | FOAM | INORGANIC FIXATION | FILTRATE | FOAM |
|---|---|---|---|---|---|---|---|---|
| Intracid Fast Yellow 2GL-S | A. 17 | G | F | V. Light Yellow | Y | NG | Yellow | Y |
| Intralan Brilliant Yellow 3GL | A- | G | M | C | Y | G | C | Y |
| Nylanthrene Brilliant Yellow 4NGL | A. 49 | G | F | Light Yellow | Y | NG | Yellow | Y |
| Stylacyl Yellow RG | A. 200 | G | F | Faint Yellow | Y | G | V. Light Yellow | Y |
| Intralite Yellow 5GLL | D. 44 | G | F | Faint Yellow | Y | G | Light Yellow | Y |
| Intralite Yellow 2RLSW | D- | G | M | Faint Yellow | N | G | Faint Orange | Y |
| Intracron Brilliant Yellow G-E | R. 81 | G | F | C | Y | G | C | Y |
| Intracron Brilliant Yellow 6G-E | R. 135 | G | M | C | N | G | Faint Yellow | Y |

TABLE 3

| DYE | C.I. | ORGANIC FIXATION | FILTRATION RATE | FILTRATE | FOAM | INORGANIC FIXATION | FILTRATE | FOAM |
|---|---|---|---|---|---|---|---|---|
| Nylanthrene Blue LGGL | A. 40 | G | F | C | Y | NG | Lt.-Dk. Blue | Y |
| Nylanthrene Brilliant Blue 2RFF | A- | G | M-F | Light Blue | N | NG | Lt.-Dk. Blue | Y |
| Stylacyl Blue RP | A. 298 | NG | S | Clean to Blue | N | NG | Clean to Blue | N |
| Intralite Turquoise Blue GRLL | D. 189 | G | S | C | Y | G | C | Y |
| Intralite Blue 8GLL | D- | G | F | C | Y | G | V. Light Pink | Y |
| Intralite Blue 3GLST | D- | G | M | C | N | NG | Dark Blue | Y |
| Intracron Turquoise HA | R. 71 | G | M | C | Y | G | C | Y |
| Intracron Turquoise Blue G-E | R. 7 | G | M | C | N | G | C | Y |

TABLE 4

| DYE | C.I. | ORGANIC FIXATION | FILTRATION RATE | FILTRATE | FOAM | INORGANIC FIXATION | FILTRATE | FOAM |
|---|---|---|---|---|---|---|---|---|
| Intralan Grey BL-S | A. 60S | G | F | C | Y | G | Faint Pink | Y |
| Direct Black E-SE | D- | G | M | Faint Yellow | Y | NG | Dark Brown | Y |
| Intracron Black VS-B | R. 5 | G | F | Faint Purple | N | NG | Faint to Dark Purple | Y |

EXAMPLE 3

The products according to the present invention were evaluated in polypropylene at a 1.0% dye/kaolin pigment level. The actual dye level of each dye/kaolin pigment was as follows:
(a) 36.0% c.i. reactive yellow 111/fine particle kaolin.
(b) 40.0% c.i. reactive blue 209/fine particle kaolin.
(c) 33.3% c.i. reactive red 124/fine particle kaolin.

The products were incorporated into the polypropylene which was the commercial product Himont 66.1 at the 1.0% organic dye/kaolin pigment level. The results are set forth in Table 5 below wherein tensile modulus, tensile yield, flexural modulus, flexural strength and izod impact are indicated in comparison with a control. In general there was a modest gain in tensile and flexural properties from the addition of the organic dye/kaolin product to the polypropylene.

TABLE 5

|  | TENSILE MODULUS, psi | TENSILE YIELD, psi | FLEXURAL MODULUS, psi | FLEXURAL STRENGTH, psi | IZOD IMPACT, ft-lb/in |
|---|---|---|---|---|---|
| Control (no dye/ kaolin pigment) | 233,400 | 5,154 | 239,900 | 7,180 | 1.02 |
| 1.0% A | 308.000 | 5,362 | 267,300 | 7,329 | 1.12 |
| 1.0% B | 279,900 | 5,349 | 268,300 | 7,363 | 0.80 |
| 1.0% C | 303,900 | 5,283 | 259,600 | 7,158 | 0.80 |

NOTE: Sample with A showed fair dispersion; sample with B, poor dispersion; sample with C, fair-to-poor dispersion.

The invention has been described herein with reference to certain preferred embodiments. However, as obvious variations thereon will become apparent to those skilled in the art, the invention is not to be considered as limited thereto.

I claim:

1. A coloring pigment which comprises the reaction product of a mineral pigment, a water-soluble organic dye and a polymeric ionic chemical fixative, selected from the group consisting of cationic polymers and inorganic polymers whereby said water-soluble dye is fixed onto said mineral pigment by addition of said ionic chemical fixative.

2. The coloring pigment of claim 1, wherein said mineral pigment is selected from the group consisting of hydrous clays, calcined clays, synthetic alkali metal alumino-silicates, micas, alumina trihydrate and mixtures thereof.

3. The coloring pigment of claim 2, wherein said hydrous and calcined clays are selected from the group consisting of kaolins and synthetic alkali metal aluminosilicate.

4. The coloring pigment of claim 1, wherein said water-soluble organic dye is selected from the group consisting of acid, basic, direct and reactive dyes.

5. The coloring pigment of claim 1, wherein said cationic polymer is a polyquaternary ammonium polymer selected from the group consisting of plyamide polymers and polyamine polymers.

6. The process for producing a mineral based coloring pigment which comprises reacting a mineral pigment with a water-soluble organic dye in the presence of a polymeric ionic chemical fixative selected from the group consisting of cationic polymers and inorganic polymers whereby said water-soluble dye is fixed onto said mineral pigment by addition of said ionic chemical fixative.

7. A process according to claim 6, wherein said mineral-based coloring pigment is produced by dissolving a water-soluble organic dye in water, adding a slurry of said mineral pigment to said dye/water solution, and then adding said ionic chemical fixative to said mixture of dye and mineral pigment.

8. The process for producing a coloring pigment according to claim 7, wherein:

(a) a water-soluble organic dye is added to a sufficient amount of demineralized water to dissolve said water-soluble organic dye to form a dye solution;

(b) said mineral pigment is added to said dye solution to form a dye/mineral mixture;

(c) said ionic chemical fixative is titrated into said dye/mineral mixture to an end point at which said water-soluble organic dye is fixed onto said mineral pigment thereby forming a dye/mineral slurry;

(d) recovering a solid coloring pigment.

9. The process for producing a coloring pigment according to claim 8, wherein said dye solution of step (a) comprises between about 1.0 to about 2.0% by weight of said water-soluble organic dye.

10. The process for producing a coloring pigment according to claim 2, wherein the pH is adjusted prior to step (d) to between about 4.0 to 6.0.

11. The process according to claim 8, wherein said mineral pigment is selected from the group consisting of hydrous clays, calcined clays, synthetic alkali metal alumino-silicates, micas and alumina trihydrate.

12. The process according to claim 8, wherein said water-soluble organic dye is selected from the group consisting of acid, basic, direct and reactive dyes.

13. The process according to claim 6, wherein said ionic chemical fixative is a cationic quaternary ammonium polymer.

14. The process according to claim 13, wherein said quaternary ammonium is a ply quaternary ammonium polymer selected from the group consisting of polyamide polymers and polyamine polymers.

15. A rubber composition which contains a coloring pigment, said coloring pigment comprising the reaction product of a mineral pigment, a water-soluble organic dye and an ionic chemical fixative, selected from the group consisting of cationic polymers and inorganic polymers whereby said water-soluble organic dye is fixed onto said mineral pigment by means of said ionic chemical fixative.

16. A plastic composition comprising a coloring pigment, said coloring pigment comprising the reaction product of a mineral pigment, a water-soluble organic dye and an ionic chemical fixative, selected from the group consisting of cationic 17. A composition according to claim 16, wherein said plastic is a polyolefin.

18. A paint composition which contains a coloring pigment, said coloring pigment comprising the reaction product of a mineral pigment, a water-soluble organic dye and an ionic chemical fixative selected from the group consisting of cationic polymers and inorganic polymers whereby said water-soluble organic dye is fixed onto said mineral pigment by means of said ionic chemical fixative.

19. A paper composition which contains a coloring pigment, said coloring pigment comprising the reaction product of a mineral pigment, a water-soluble organic dye and an ionic chemical fixative, selected from the group consisting of cationic polymers and inorganic polymers whereby said water-soluble organic dye is fixed onto said mineral pigment by means of said ionic chemical fixative.

20. A elastomer composition which contains a coloring pigment, said coloring pigment comprising the reaction product of a mineral pigment, a water-soluble organic dye and an ionic chemical fixative, selected from the group consisting of cationic polmers and inorganic polymers whereby said water-soluble organic dye is fixed onto said mineral pigment by means of said ionic chemical fixative.

21. A printing ink composition which contains a coloring pigment, said coloring pigment comprising the reaction product of a mineral pigment, a water-soluble organic dye and an ionic chemical fixative, selected from the group consisting of cationic polymers and inorganic polymers whereby said water-soluble soluble organic dye is fixed onto said mineral pigment by means of said ionic chemical fixative.

* * * * *